United States Patent [19]
Grüning

[11] Patent Number: 6,166,456
[45] Date of Patent: Dec. 26, 2000

[54] HIGH-SPEED DISCONNECTOR USING SEMICONDUCTOR TECHNOLOGY

[75] Inventor: Horst Grüning, Wettingen, Switzerland

[73] Assignee: Asea Brown Boveri AG, Baden, Switzerland

[21] Appl. No.: 09/218,307

[22] Filed: Dec. 22, 1998

[30] Foreign Application Priority Data

Dec. 22, 1997 [DE] Germany .......................... 197 57 191

[51] Int. Cl.⁷ ............................................. H01H 37/00
[52] U.S. Cl. ............................................. 307/64; 307/116
[58] Field of Search ............................. 307/64, 87, 116; 323/258; 363/43, 132

[56] References Cited

U.S. PATENT DOCUMENTS 5,517,378  5/1996  Asplund et al. ............................ 361/4
5,602,462  2/1997  Stich et al. ................................ 323/258

FOREIGN PATENT DOCUMENTS

2666941 A1  3/1992  France .
2666941 B1  3/1992  France .
3326474 A1  2/1985  Germany .

OTHER PUBLICATIONS

GE SCR Manual Third Edition pp. 53, 105 and 106, Jan. 1980.

Primary Examiner—Josie Ballato
Assistant Examiner—Robert L. Deberadinis
Attorney, Agent, or Firm—Oblon, Spivak, McClelland, Maier & Neustadt, P.C.

[57] ABSTRACT

The invention specifies a disconnector for decoupling a load from a supplying AC voltage network. The disconnector comprises at least one disconnector stage having a series circuit comprising at least two reverse-conducting gate turn-off thyristors which are connected cathode to cathode. The gate turn-off thyristors are preferably hard driven. This allows the use of a single circuit capacitor in parallel with the series-connected gate turn-off thyristors. This embodiment has the advantage that, during disconnection, the current commutates early from the gate turn-off thyristors, which means that the disconnection capacity can be increased.

15 Claims, 3 Drawing Sheets

HIGH-SPEED DISCONNECTOR USING SEMICONDUCTOR TECHNOLOGY

BACKGROUND OF THE INVENTION

1. Field of the Invention

The invention relates to the field of power electronics. It is based on a high-speed disconnector using semiconductor technology, in accordance with the preamble to the first claim, particularly suitable for uninterruptible power supplies for a load supplied by an AC voltage network. A disconnector of this generic type is described in the French patent application FR 2 666 941 A1, for example.

2. Discussion of Background

Disconnectors or switches of this generic type are used for decoupling the load from a supplying AC voltage network. They can be used, in particular, for uninterruptible power supplies. Uninterruptible power supplies have an auxiliary voltage source which can be coupled to the load by coupling means after the load has been disconnected from the AC voltage network. The auxiliary voltage source can, by way of example, comprise a battery, whose DC voltage is converted to an AC voltage by means of a converter, a diesel unit or a rotating system which utilizes the kinetic energy of a generator.

High-speed uninterruptible power supplies having reaction times in the millisecond range are generally used, in particular, for sensitive loads such as computer systems or electronic apparatuses in hospitals. This makes it possible to ensure that all types of transient disruptions and brief voltage dips can be bridged, so that the load always has access to an uninterrupted AC voltage. The power requirement of such loads does not normally exceed a few tens of kW. Devices having power transistors or IGBTs can therefore be used as disconnectors.

Nowadays, solutions using rotary converters are preferred for sensitive loads with a relatively high power requirement (e.g. 0.5–2 MW). In this case, the kinetic energy of a generator is used to support ms-duration dips. If the disruption lasts for a longer time, a further inertial mass is connected by means of a dynamic coupling. In addition, a diesel unit can be started up and connected, in order to span minute-long disruptions as well. Such rotating systems have been prior art for years and have proved themselves in principle. However, on account of the complex mechanisms and the occasional need for continuous operation of the equipment, they require a high level of maintenance and have no significant losses. Furthermore, a number of systems need to be connected in parallel for powers greater than 2 MW.

For economic and technical reasons, it has not been possible up to now to transfer known electronic circuits to high-power applications.

SUMMARY OF THE INVENTION

Accordingly, one object of the invention is to provide a novel high-speed disconnector which uses semiconductor technology, is suitable for very high powers, works reliably and with a minimum of maintenance, and can disconnect a load from the supplying AC voltage network in a matter of milliseconds. This object is achieved by the features of the independent claims.

The essence of the invention, therefore, is to design the disconnector or switch using at least one electronic disconnector stage having a series circuit comprising at least two reverse-conducting gate turn-off thyristors which are connected cathode to cathode. Non-reverse-conducting gate turn-off thyristors having a reverse-connected parallel diode can also be used. The gate turn-off thyristors are preferably hard driven. As a result of this, the reaction time of the gate turn-off thyristors is shortened. This allows the advantages of a series circuit to be utilized, and only one surge arrester to be arranged in parallel with a number of disconnector stages. In addition, this embodiment has the advantage that, during turn-off, the current commutates early from the gate turn-off thyristors, which means that the disconnection capacity can be increased. The surge arrester, e.g. in the form of a varistor, protects the disconnector stages against transients and erroneous distribution of the voltage in the series circuit. In addition, this surge arrester can effectively absorb the power from the network inductance and hence render further circuitry superfluous. The disconnector can comprise a number of disconnector stages connected in series and is thus of modular design. The power supply to the drive units required for the gate turn-off thyristors deserves particular attention. This is because, in the switched-on state, a continuous gate current has to be delivered by said power supply for a relatively long time without any anode voltage being available. The supply needs to be able to withstand the switched-off state only for a short time, namely at least for as long as a mechanical disconnector arranged in series with the electronic disconnector requires for switching off. After the mechanical disconnector has opened, the electronic disconnector can be closed again. The potential of the drive and voltage supply units required for the gate turn-off thyristors is thus defined again, and the circuit is in a steady state. These switching-off processes are rare occurrences, so that the necessary power can be derived from electrolytic capacitors in the drive unit. Hence, in one preferred exemplary embodiment, the drive units are supplied with power from the AC voltage network via a transformer.

The auxiliary AC voltage preferably comprises a DC voltage source which is converted into an AC voltage by means of a converter. The power supply according to the invention is of particularly advantageous design in that the converter is likewise equipped with hard-driven gate turn-off thyristors. Further advantageous embodiments can be found in the appropriate dependent claims. The advantages of the invention can be seen, in particular, in that the electronic disconnector is also suitable for very high powers. It is sufficiently fast to support brief voltage dips and transients. In addition, the use of hard-driven gate turn-off thyristors allows a reduction in circuit complexity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
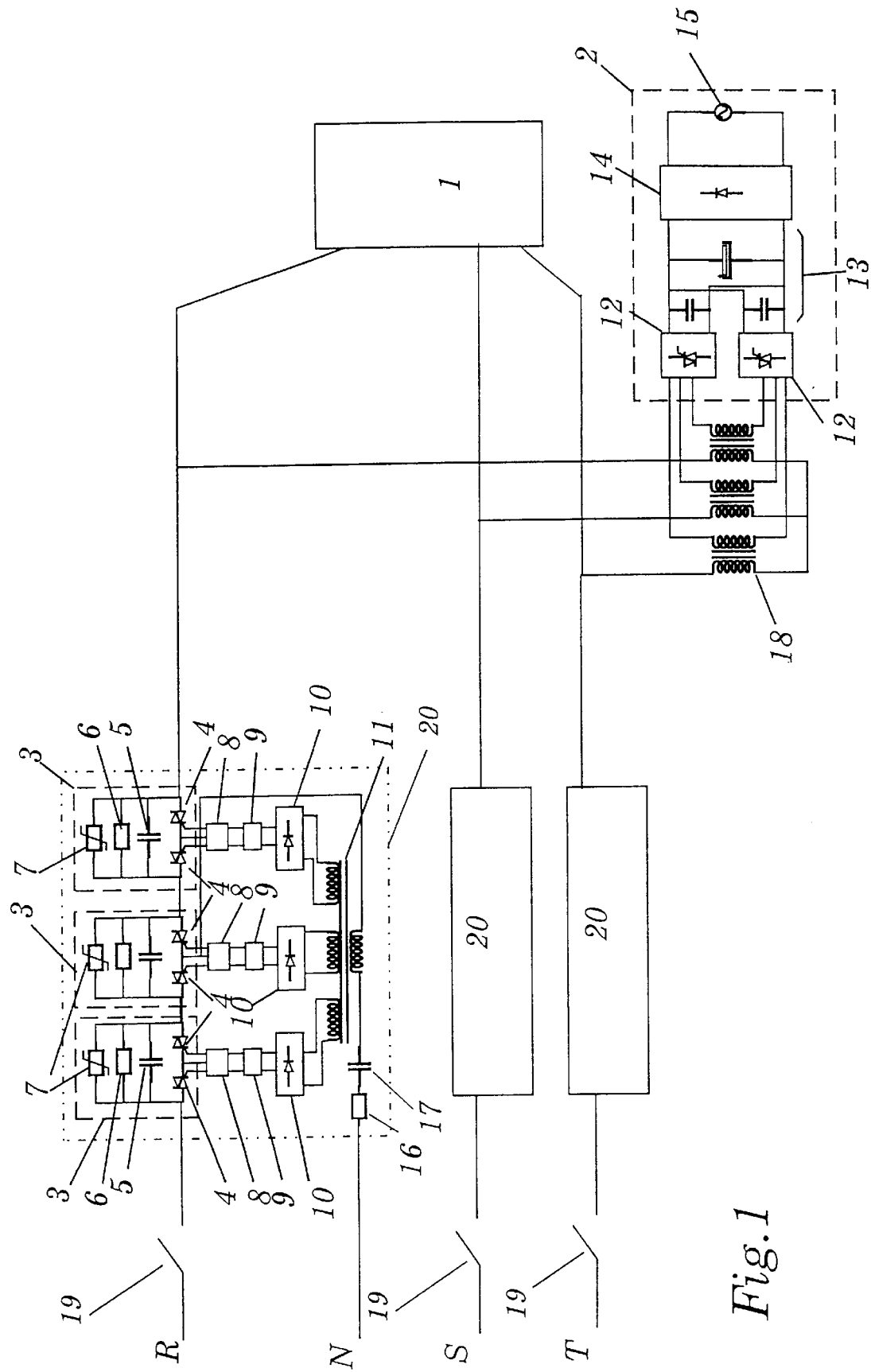
FIG. 1 shows a block diagram of an embodiment of the invention.

Referring now to the drawings, wherein like reference symbols designate identical or corresponding parts throughout the several views, said reference symbols and their meaning being summarized in the list of designations, FIG. 1 shows an exemplary embodiment of the invention. R, S, T and N denote an AC voltage network connected to a load 1. The load is, in particular, sensitive high-power electrical equipment which has to be protected against disruptions in and failures of the AC voltage network. For this purpose, an auxiliary voltage source 2 is provided, which can be coupled to the load 1 if required. A three-phase transformer 18 can be provided for coupling. By way of example, the auxiliary voltage source 2 comprises an AC voltage source 15 which is converted into a DC voltage source by means of a rectifier 14 and intermediate circuit capacitors 13. The DC voltage is then converted into an AC voltage again by means of the converter 12, and is passed on to the load 1 via the transformer 18.

Figure 2:
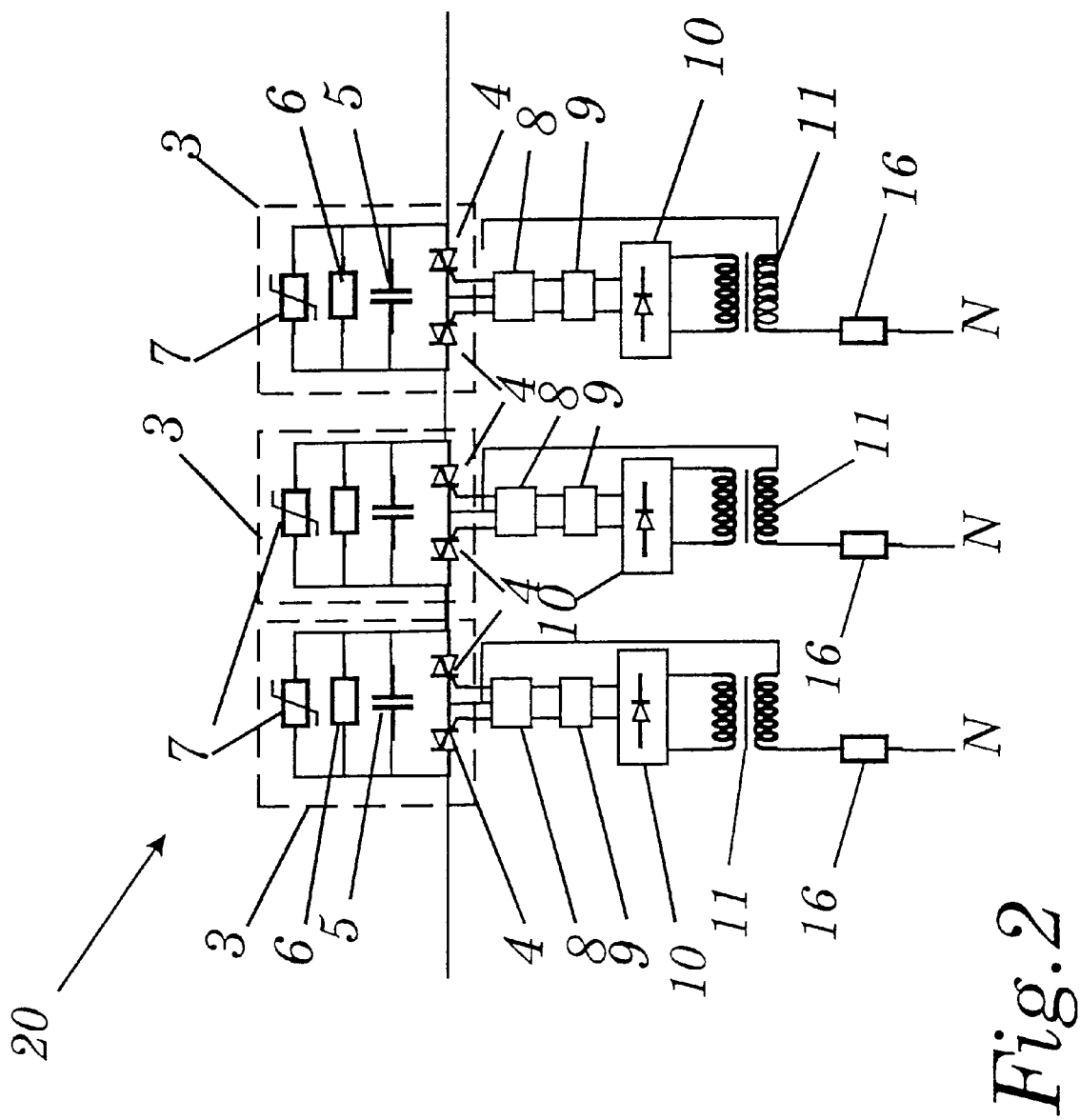
FIG. 2 shows a block diagram with a variant for supplying and driving the gate turn-off thyristors.

In order for it to be possible to decouple the load 1 from the AC voltage network (R, S, T, N), an electronic switch or disconnector 20 is provided which must be capable of interrupting the flow of current between the network and the load 1 reliably and quickly. According to the invention, the disconnector 20 has, for each phase, at least one disconnector stage 3 having a series circuit comprising at least two gate turn-off thyristors 4 which are connected cathode to cathode. This creates a bidirectional switching unit whose gate drive can be supplied by the same potential. A mechanical switch or disconnector 19 can additionally be provided. Normally, the gate turn-off thyristors 4 are switched on, i.e. they conduct the current, and the mechanical switch or disconnector 19 is closed. The current required for the gate turn-off thyristors 4 is provided by a drive circuit 8 which is powered by a supply circuit 9. The drive unit 8 must therefore provide a continuous gate current for a relatively long time without any anode voltage being provided. Conversely, the gate turn-off thyristors 4 need to be switched off only for a relatively short time (in the event of disruptions in the network). If the load 1 is to be disconnected from the voltage supply network R, S, T, then the mechanical disconnector 19 and the electronic disconnector 20 simultaneously receive opening commands. The electronic disconnector 20 will, of course, open faster. When the mechanical disconnector 19 is also open, the electronic disconnector 20 can be closed again. The supply circuit 9 and the drive unit 8 are consequently supplied with voltage again, because the primary winding of the transformer 11 is then supplied by the auxiliary voltage source 2. The circuit is thus in a defined state again. Switching processes of this type are therefore only rare occurrences. Accordingly, it is sufficient if the necessary switching energy is derived from electrolytic capacitors provided for this purpose in the drive units 8. In addition to the supply circuit 9, the supply to the drive units 8 therefore preferably comprises transformers 11 and rectifiers 10 which, depending on whether the disconnectors are open, are supplied by the network voltage or by the auxiliary voltage source 2. The transformer 11 is connected between the phase R, S or T and the neutral conductor N. For a number of disconnector stages 3 connected in series, the transformers 11 can be combined such that a number of secondary windings are supplied by one primary winding (FIG. 1). However, a separate transformer 11 can also be provided for each disconnector stage 3 (FIG. 2). In the first variant, preferably no more than three disconnector stages 3 are assigned to one primary winding, in order to keep the transformer 11 small. Ideally, the middle secondary winding is in this case connected to the phase conductor R, S or T. This keeps the voltage differences with respect to the adjacent disconnector stages 3 small, and the requirements for insulating the transformer 11 can be kept within a sensible range. It is naturally also possible for more than three series-connected disconnector stages 3 to be provided. In this case, it is advantageous to combine three secondary windings with one primary winding in every case. For protection purposes, it is additionally possible for a protective resistor 16 and a capacitor 17 to be provided between the neutral conductor and the transformer, which distribute the network voltage. This is also advantageous in respect of the insulation required for the transformer 11.

Figure 3:
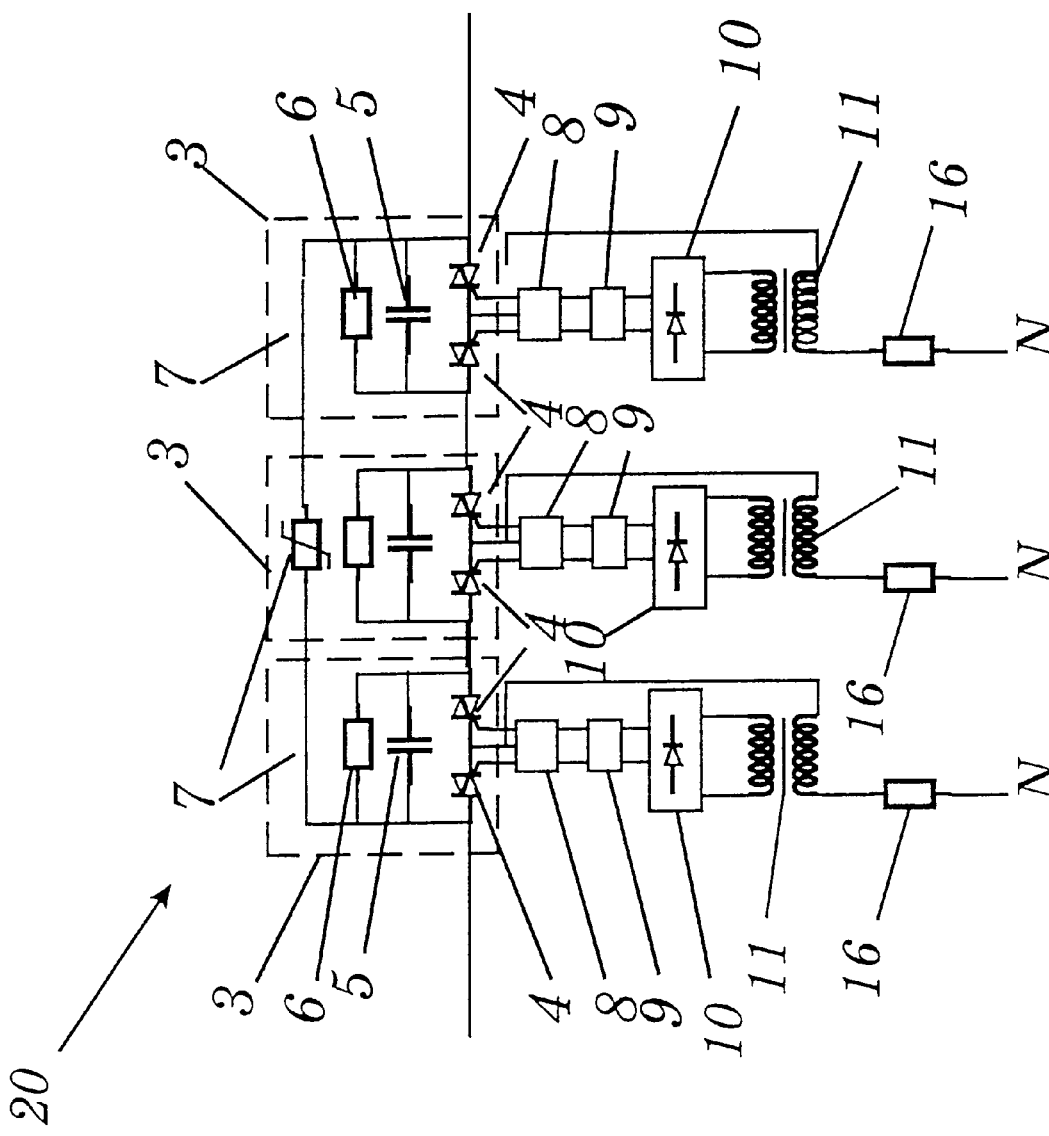
FIG. 3 shows a further variant of the exemplary embodiment.

The gate turn-off thyristors 4 in a disconnector stage 3 are preferably hard-driven. This reduces the reaction time of the gate turn-off thyristors 4. Furthermore, hard driving allows the advantages of series-connected disconnector stages 3 to be utilized: in this case, just one surge arrester 7 can be provided for the series-connected disconnector stages 3 (see FIG. 3). Another parallel resistor 6 may optionally be provided. In addition, a parallel surge arrester 7, e.g. in the form of a varistor, may be provided which protects the gate turn-off thyristors 4 against transients and erroneous distribution of the voltage in the series-connected disconnector stage 3. Instead of providing an individual surge arrester 7 for each disconnector stage 3, it is also possible to provide a common surge arrester arranged in parallel with the whole series circuit.

In the above description, the disconnector for only one phase was discussed. However, it goes without saying that disconnectors 20 are provided in the same way for each phase. This is indicated schematically in FIG. 1 by the box marked 20. The number of series-connected disconnector stages 3 in a disconnector 20 depends essentially on the withstand voltage required.

The converters 12 are preferably likewise equipped with hard-driven gate turn-off thyristors. In this case, it is also possible for the extensive circuitry of the converter 12 to be omitted to a large degree.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high-speed disconnector using semiconductor technology for disconnecting a load from a supplying AC voltage network to protect the load against a disruption or a failure in the supplying AC voltage network, comprising:
   at least one disconnector stage, said at least one disconnector stage having a series circuit having
      at least one pair of gate turn-off thyristors connected cathode to cathode, wherein said gate turn-off thyristors being either reverse conducting or non-reverse conducting, and
      a reverse-connected parallel diode if said gate turn-off thyristors are non-reverse conducting.

2. The high-speed disconnector of claim 1, further comprising:
   at least one capacitor respectively connected in parallel with respective of the at least one pair of gate turn-off thyristors.

3. The high-speed disconnector of claim 2, further comprising:
   at least one surge arrester respectively connected in parallel with respective of the at least one pair of gate turn-off thyristors.

4. The high-speed disconnector of claim 2, wherein:
   the at least one disconnector stage comprises at least two disconnector stages, said at least two disconnector stages being consecutively connected, and further comprising,
a common surge arrester connected in parallel with the at least two disconnector stages.

5. The high-speed disconnector of claim 2, wherein:
the at least one pair of gate turn-off thyristors are hard-driven.

6. The high-speed disconnector of claim 2, further comprising:
a drive unit configured to drive the at least one pair of gate turn-off thyristors, said drive unit deriving a supply voltage from the supplying AC voltage network via a supply transformer.

7. The high-speed disconnector of claim 3, further comprising:
a drive unit configured to drive the at least one pair of gate turn-off thyristors, said drive unit deriving a supply voltage from the supplying AC voltage network via a supply transformer.

8. The high-speed disconnector of claim 3, wherein:
the at least one pair of gate turn-off thyristors are hard-driven.

9. The high-speed disconnector of claim 4, wherein:
the at least one pair of gate turn-off thyristors are hard-driven.

10. The high-speed disconnector of claim 4, further comprising:
a drive unit configured to drive the at least one pair of gate turn-off thyristors, said drive unit deriving a supply voltage from the supplying AC voltage network via a supply transformer.

11. The high-speed disconnector of claim 1, wherein:
the at least one pair of gate turn-off thyristors are hard-driven.

12. The high-speed disconnector of claim 11, further comprising:
a drive unit configured to drive the at least one pair of gate turn-off thyristors, said drive unit deriving a supply voltage from the supplying AC voltage network via a supply transformer.

13. The high-speed disconnector of claim 1, further comprising:
a drive unit configured to drive the at least one pair of gate turn-off thyristors, said drive unit deriving a supply voltage from the supplying AC voltage network via a supply transformer.

14. An uninterruptible power supply for a load supplied by an AC voltage network, comprising:
a disconnector configured to decouple the load from the AC voltage network, said disconnector having
at least one disconnector stage having a series circuit having
at least one pair of gate turn-off thyristors connected cathode to cathode, wherein said gate turn-off thyristors being either reverse conducting or non-reverse conducting, and
a reverse-connected parallel diode if said gate turn-off thyristors are non-reverse conducting;
an auxiliary AC voltage source; and
means for coupling the auxiliary AC voltage source to the load.

15. The uninteruptible power supply of claim 14, wherein:
the coupling means comprises a transformer, and
the auxiliary AC voltage source comprises a DC voltage source that is converted to an AC voltage by a converter, said converter having hard-driven gate turn-off thyristors.

* * * * *